(12) United States Patent
Mormino, Sr.

(10) Patent No.: US 10,167,601 B2
(45) Date of Patent: Jan. 1, 2019

(54) GENERATOR FOR CONVERTING TIDAL FLUCTUATION TO ELECTRICAL ENERGY

(71) Applicant: Thomas Mormino, Sr., Staten Island, NY (US)

(72) Inventor: Thomas Mormino, Sr., Staten Island, NY (US)

(73) Assignee: GLOBAL TIDAL ENERGY SYSTEMS LLC, Staten Island, NY (US)

( * ) Notice: Subject to any disclaimer, the term of this patent is extended or adjusted under 35 U.S.C. 154(b) by 0 days.

(21) Appl. No.: 15/409,722

(22) Filed: Jan. 19, 2017

(65) Prior Publication Data

US 2017/0204578 A1 Jul. 20, 2017

Related U.S. Application Data

(60) Provisional application No. 62/280,961, filed on Jan. 20, 2016.

(51) Int. Cl.
| | | |
|---|---|---|
| *F02B 9/08* | (2006.01) | |
| *F03B 13/26* | (2006.01) | |
| *H02K 7/18* | (2006.01) | |
| *E02B 9/08* | (2006.01) | |

(52) U.S. Cl.
CPC .............. *E02B 9/08* (2013.01); *F03B 13/262* (2013.01); *F05B 2240/91* (2013.01); *F05B 2260/4031* (2013.01); *Y02E 10/28* (2013.01)

(58) Field of Classification Search
CPC ............. F02B 9/08; F03B 13/262; E02B 9/08

USPC .......................................................... 290/53
See application file for complete search history.

(56) References Cited

U.S. PATENT DOCUMENTS

| | | | | |
|---|---|---|---|---|
| 968,930 | A * | 8/1910 | Fuchs .................... | F01B 17/02 60/507 |
| 4,034,565 | A * | 7/1977 | McVeigh ............. | F03B 17/025 60/503 |
| 4,541,242 | A * | 9/1985 | Thompson, Jr. .... | F03B 13/1815 60/506 |
| 4,610,140 | A * | 9/1986 | Thompson, Jr. .... | F03B 13/1815 474/148 |
| 6,681,572 | B2 * | 1/2004 | Flory ....................... | E02B 9/08 60/497 |
| 8,110,935 | B2 * | 2/2012 | Shin .................... | F03B 13/1865 290/42 |
| 8,912,678 | B2 * | 12/2014 | Nozawa ............... | F03B 13/186 290/42 |
| 2008/0018114 | A1 * | 1/2008 | Weldon ................ | F03B 13/181 290/53 |

(Continued)

*Primary Examiner* — Tulsidas C Patel
*Assistant Examiner* — Joseph Ortega
(74) *Attorney, Agent, or Firm* — Dunlap Bennett & Ludwig PLLC

(57) ABSTRACT

A generator for converting tidal fluctuation to electrical energy is provided. The generator includes at least a first energy transfer mechanism. The first energy transfer mechanism includes a weight that is floatable in water. The first energy transfer mechanism further includes a first driver gear and a coupling rod connecting the weight to the first driver gear. The coupling rod rotates the first driver gear when the weight rises or lowers while floating on the water. Therefore, linear vertical motion of the tides is converted into rotational motion. A rotor is rotated by the first driver gear when the first driver gear is rotated by the coupling rod.

3 Claims, 4 Drawing Sheets

(56) References Cited

U.S. PATENT DOCUMENTS

| | | | |
|---|---|---|---|
| 2012/0112472 A1* | 5/2012 | Murray | H02J 15/003 290/1 R |
| 2015/0035283 A1* | 2/2015 | Lee | F03B 13/1885 290/53 |
| 2017/0114771 A1* | 4/2017 | Lim | F03B 13/20 |

* cited by examiner

GENERATOR FOR CONVERTING TIDAL FLUCTUATION TO ELECTRICAL ENERGY

CROSS-REFERENCE TO RELATED APPLICATION

This application claims the benefit of priority of U.S. provisional application No. 62/280,961, filed Jan. 20, 2016, the contents of which are herein incorporated by reference.

BACKGROUND OF THE INVENTION

The present invention relates to harnessing tidal energy and, more particularly, to a generator for converting tidal fluctuation to electrical energy.

In electricity generation, an electric generator is a device that converts mechanical energy to electrical energy. A generator forces electric current to flow through an external circuit. The source of mechanical energy may be a reciprocating or turbine steam engine, water falling through a turbine or waterwheel, an internal combustion engine, a wind turbine, a hand crank compressed air, or any source of mechanical energy. Generators provide nearly all of the power for electric power grids. Efficient, inexpensive, and clean electric generators are highly desirable.

As can be seen, there is a need for an improved and environmentally clean electrical generators.

SUMMARY OF THE INVENTION

In one aspect of the present invention, a generator for converting tidal fluctuation to electrical energy comprises: a first energy transfer mechanism comprising: a weight floatable in water; a first driver gear; and a coupling rod connecting the weight to the first driver gear, wherein the coupling rod rotates the first driver gear when the weight rises or lowers while floating on the water; and a rotor rotated by the first driver gear when the first driver gear is rotated by the coupling rod.

In another aspect of the present invention, a generator for converting tidal fluctuation to electrical energy comprises: a first energy transfer mechanism comprising: a weight floatable in water; a first driver gear; and a coupling rod connecting the weight to the first driver gear, wherein the coupling rod rotates the first driver gear when the weight lowers within the water; a second energy transfer mechanism comprising: a weight floatable in water; a first driver gear; a second driver gear interlocked with the first driver gear; and a coupling rod connecting the weight to the first driver gear, wherein the coupling rod rotates the first driver gear when the weight rises within the water, wherein a rotor rotated by the first driver gear of the first energy transfer mechanism and the second driver gear of the second energy transfer mechanism when the first driver gears are rotated by the coupling rod.

These and other features, aspects and advantages of the present invention will become better understood with reference to the following drawings, description and claims.

DETAILED DESCRIPTION OF THE INVENTION

Figure 1:
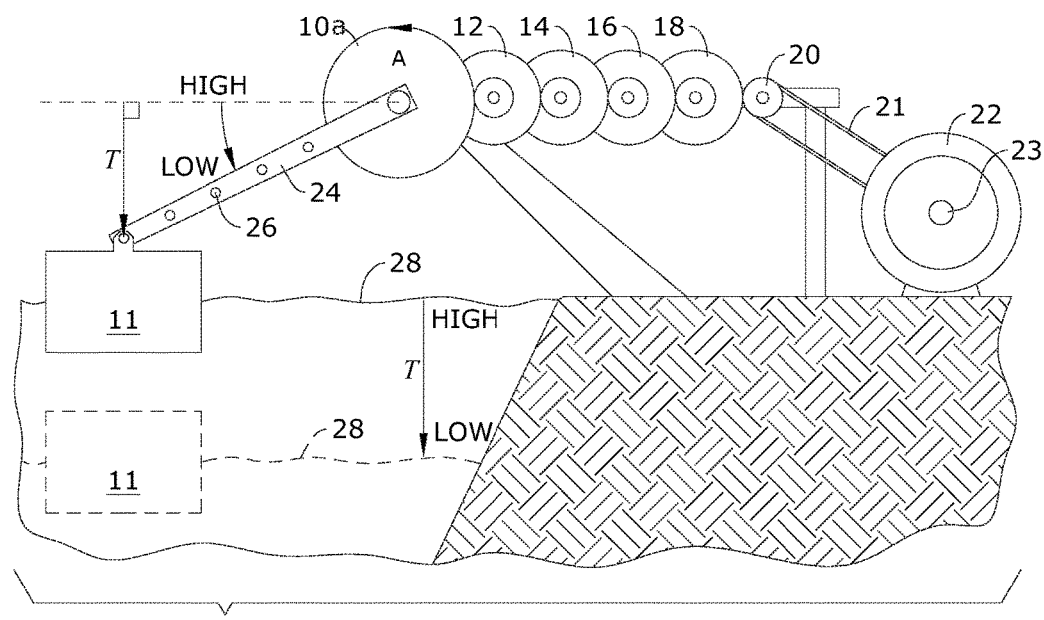
FIG. 1 is a schematic view of an embodiment of the present invention illustrating the high to low tide cycle.
Figure 2:
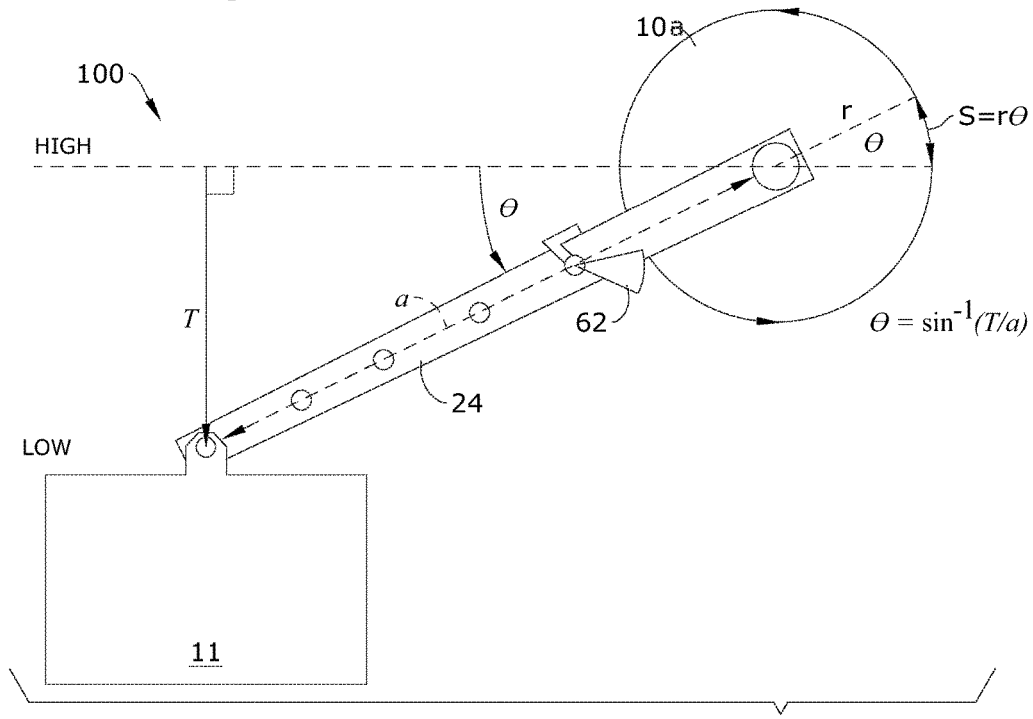
FIG. 2 is a partial schematic view of an embodiment of the present invention illustrating the high to low tide cycle.
Figure 3:
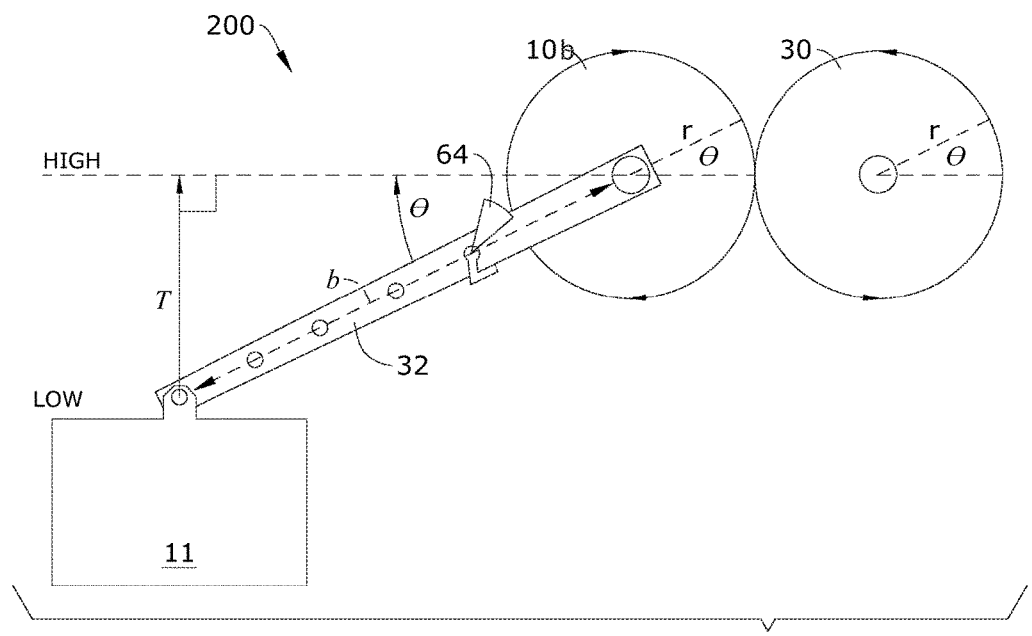
FIG. 3 is a partial schematic view of an embodiment of the present invention illustrating the low to high tide cycle.
Figure 4:
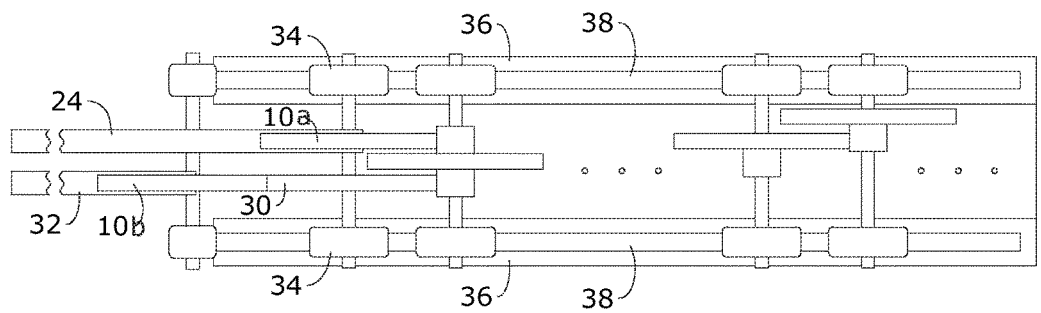
FIG. 4 is a partial top view of an embodiment of the present invention.
Figure 5:
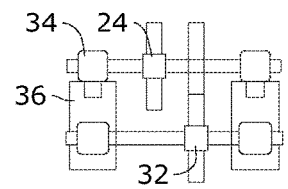
FIG. 5 is a partial front view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention converts the rise and fall of the tides to rotational motion on land to generate electricity. The vertical rise and fall of the tides, which acts on floating bodies, is almost an infinite source of pollution free potential energy, created and depleted approximately every six hours. Utilizing that potential energy provides a free, green, unlimited source of electrical energy without the need of exploration, mining, refining, transporting and burning as with fossil/nuclear fuels.

The present invention includes a floating weight that linearly rises and falls with a tidal range. The vertical motion is captured by a simple gear system called a compound gear train. The land based gear train converts the very slow rise and fall of the weight to a generator axle or rotor to provide electrical energy. e.g, a compound gear train of 7 gears each having a 9:1 gear ratio, where the last gear is the generator axle, if the first gear is turned twice in a tidal cycle of 6 hrs., then the axle will turn at approximately 2952 rpm. The rise and fall of the tides is a reliable, predictable and inexhaustible source of energy, freely available at the water's edge. The present invention is not dependent on variable sources of energy such as wave action, water currents, solar or wind.

Referring to FIGS. 1 through 5, the present invention includes a generator for converting tidal fluctuation to electrical energy. The present invention turns industrial motor axles in proximity to tidal ranges. The generator includes at least a first energy transfer mechanism 100. The first energy transfer mechanism 100 includes a weight 11 that is floatable in water 28. The first energy transfer mechanism 100 further includes a driver gear 10a and a coupling rod 24 connecting the weight 11 to the driver gear 10a. The coupling rod 24 rotates the driver gear 10a when the weight 11 rises or lowers while floating on the water 28. Therefore, vertical linear motion of the tides is converted into rotational motion. A rotor 23 is rotated by the driver gear 10a when the driver gear 10a is rotated by the coupling rod 24.

The coupling rod 24 of the present invention may be an elongated boom. The elongated boom may be adjustable in length. In certain embodiments, the elongated boom may include evenly spaced apertures 26 formed along a length. In such embodiments, a user may secure the weight 11 to different portions of the coupling rod 24 to adjust for different tidal ranges or angles theta.

In certain embodiments, the present invention may include the first energy transfer mechanism 100 to harness energy when the tide moves from high to low and a second energy transfer mechanism 200 to harness energy when the tide moves from low to high. The second energy transfer mechanism 200 may include a weight 11 floatable in water, a first driver gear 10b, a second driver gear 30 interlocked with the first driver gear 10b and a coupling rod 32. Use of two driver gears in mechanism 200 maintains rotation of all axles to rotor 23 in the same direction as mechanism 100 during high to low to high cycles. The weight 11 of the second energy mechanism 200 may be the same weight 11 as the first energy mechanism 100. Therefore, two coupling rods 24, 32 may be secured to the same weight 11. The coupling rod 32 connects the weight 11 to the first driver gear 10b. The coupling rod 32 rotates the first driver gear 10b when the weight 11 rises while floating on the water 28. The rotor 23 is rotated by the second driver gear 30 of the second energy transfer mechanism 200 when the first driver gear 10b of the second energy transfer mechanism 200 is rotated by the coupling rod 32.

As mentioned above, the first energy transfer mechanism 100 may rotate the rotor 23 when the tide moves from high to low. The first energy transfer mechanism 100 may include a swivel gear 62 pivotally secured to the coupling rod 24. A small counter weight attached to swivel gear 62 biases swivel gear 62 towards an underside of the coupling rod 24. When the weight 11 lowers, the coupling rod 24 lowers and the teeth of the swivel gear 62 interlock with the teeth of the driver gear 10a. Since the two tangent lines to the respective gears 62 and 10a diverge at the point where they meet, then swivel gear 62 locks onto the driver gear 10a when weight 11 begins to lower. The small counter weight shown at the swivel point of swivel gear 62 gently keeps swivel gear 62 in contact with the driver gear 10a before weight 11 begins to lower. When the weight 11 of the first energy transfer mechanism 100 rises, the swivel gear 62 of the first energy transfer mechanism 100 slides along the teeth of the driver gear 10a and therefore does not interlock with the driver gear 10a during the rising of weight 11 and consequently does not rotate the rotor 23.

As mentioned above, the second energy transfer mechanism 200 may rotate the rotor 23 when the tide moves from low to high. The second energy transfer mechanism 200 may include a swivel gear 64 pivotally secured to the coupling rod 32. The weight of swivel gear 64, towards a top side of the coupling rod 32, keeps swivel gear 64 in contact with the first driver gear 10b. When the weight 11 rises, the coupling rod 32 rises and the teeth of the swivel gear 64 lock onto the teeth of the first driver gear 10b. At this point gear 64 is locked into place and rotates the first driver gear 10b clockwise, which rotates the second driver gear 30 counter clockwise. The weight 11 rises to a point where the swivel gear 64 no longer jams onto the first driver gear 10b. When the weight 11 of the second energy transfer mechanism 200 lowers, the swivel gear 64 of the second energy transfer mechanism 200 slides along the teeth of the first driver gear 10b and therefore does not rotate the first driver gear 10b and consequently the rotor 23.

In certain embodiments, the rotational motion may be transferred from the driver gears 10a, 10b to the rotor 23 by a gear train. The gear train may include interconnecting gears, including a first compound gear 12, a second compound gear 14, a third compound gear 16, a fourth compound gear 18 and a fifth compound gear 20. The number of gears in the compound gear train and their gear ratios depends on the desired RPM of rotor 23 and the size of weight 11. The first energy transfer mechanism 100 includes the coupling rod 24 rotating the driver gear 10a counter clockwise and then the driver gear 10a rotating the gear train. The second energy transfer mechanism 200 includes the coupling rod 32 rotating the first driver gear 10b clockwise, the second driver gear 30 counter clockwise and then the second driver gear 30 rotating the gear train. Therefore, the first and second energy transfer mechanisms 100, 200 rotate the gear trains in the same direction. A belt 21 (or direct gear) may connect the fifth compound gear 20 to the rotor 23 of a flywheel 22. The flywheel 22 may store rotational kinetic energy called upon during short periods of slack-water to keep the rpm of generator axle 23 fairly constant. The flywheel free-wheels in one direction but locks onto rotor 23 in the other direction to impart rotational motion to rotor 23 when flywheel 22 senses a subtle deceleration of rotor 23. The present invention may further include a frame 36 having tracks 38. Each of the gears 10a, 10b, 12, 14, 16, 18, 20, 30 may include axle mounts 34 that rest within the tracks 38. Therefore, the gears 10a, 10b, 12, 14, 16, 18, 20, 30 of each of the first and second energy transfer mechanisms 100, 200 may be easily removed, replaced and reconfigured.

In use, the floating weight 11 rises and falls vertically with the tide. The coupling rod 24, such as an adjustable length boom, attached to weight 11 provides desired torque to turn the driver gear 10a. The compound gear train converts the very slow rise and fall of the weight 11 to high rpm to rotate the rotor 23 of the generator. The flywheel 22 stores rotational energy. The energy is transferred to the rotor 23 to maintain rotational speed of the axle during slack water periods between high and low transitions. One of the earlier compound/driver gears can function as a flywheel. Optionally, a solar panel can be used to operate an electric motor to turn rotor 23 during short periods of slack water. There is complete flexibility of design regarding size of the weight, the number of gears and gear ratios. A software program may be used to calculate final rpm for different values of tidal range, boom length, gears and gear ratios.

The angle theta is determined by the height of the Tidal Range (T) and the Boom length (a). The arc length $S=r \times theta$ where r is the radius of the driver gears 10a, 10b. The relationship between S and the circumference of the first smaller gear of gear 12 in FIG. 1 determines the amount of rotation of the first entire gear 12 in FIG. 1 in one up/down tidal cycle and consequently the final gear as well. The swivel gear 62 of the first energy transfer mechanism 100 is a partial gear which swivels at its apex. This allows for the boom to lock onto the driver gear 10a on down cycle and free wheel on the up cycle. The second energy transfer mechanism 200 includes a second driver gear 30 identical to the first driver gear 10b to keep rotation of in same direction. The boom length (b) may be slightly shorter than the boom length (a) due to insertion of the second driver gear 30. This results in a favorable slightly higher output rpm, since theta, thereby S are slightly larger. The second driver gear 30 may be placed directly below the first driver gear 10b if boom lengths are desired to be the same length. The swivel gear 64 of the second energy transfer mechanism 200 allows the boom to lock onto the first driver gear 10b during up cycle and freewheel on down cycle.

Figure 6:
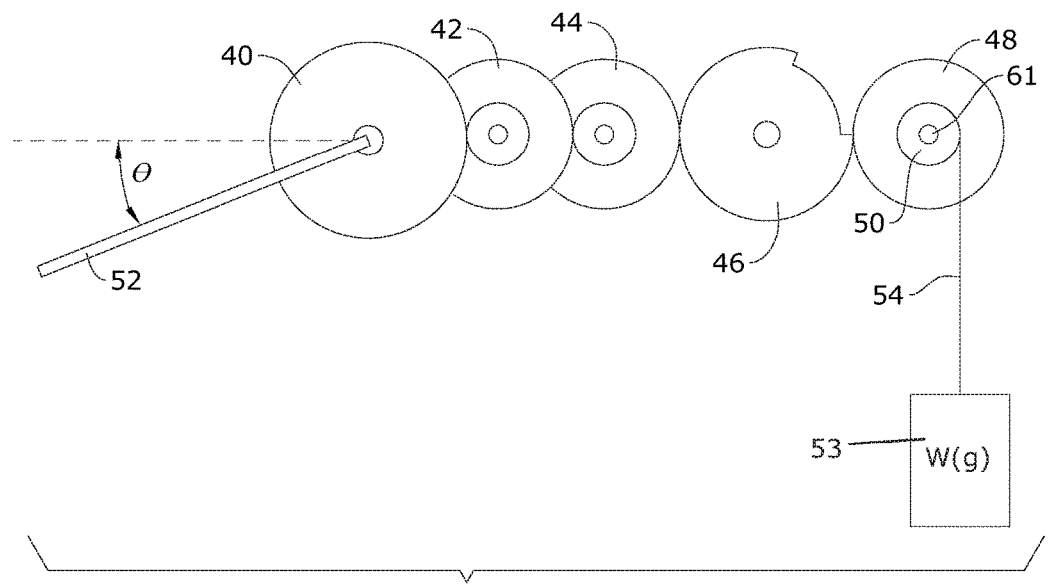
FIG. 6 is a schematic view of an embodiment of the present invention.
Figure 7:
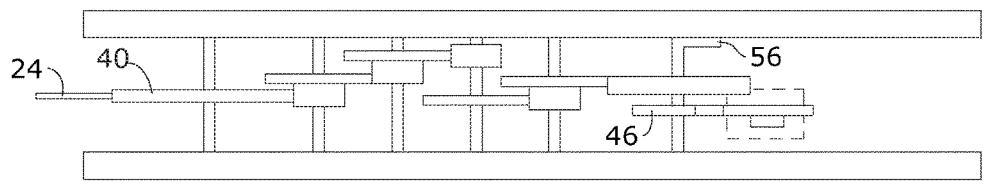
FIG. 7 is a partial top view of an embodiment of the present invention.
Figure 8:
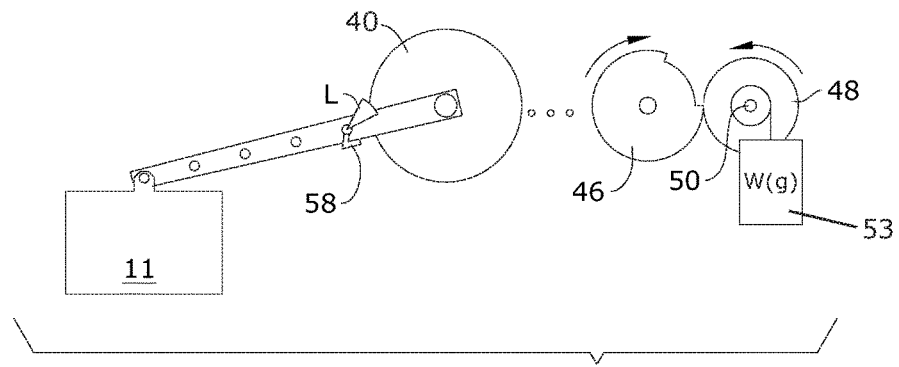
FIG. 8 is a partial schematic view of an embodiment of the present invention.
Figure 9:
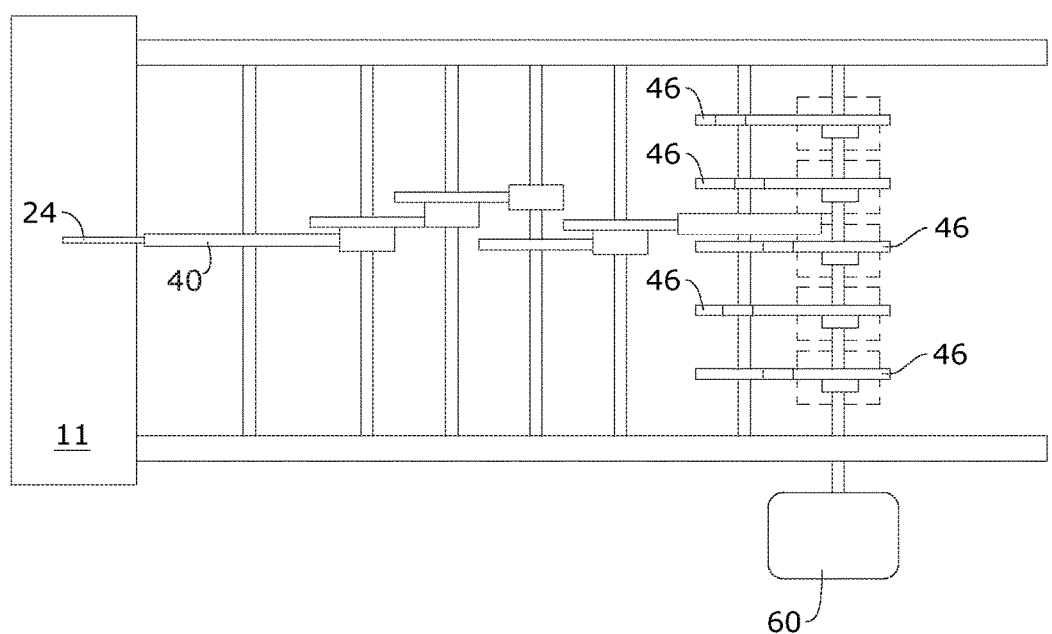
FIG. 9 is a top schematic view of an embodiment of the present invention.

The present invention may further include a loosely coupled system illustrated in FIGS. 6 through 9. The loosely coupled system may include the weight 11 from FIGS. 1 through 5 that is floatable in water 28. In FIG. 6 the loosely coupled system further includes a coupling rod 52 connecting the weight 11 to a first driver gear 40. FIG. 6 shows only one coupling rod 52 so that driver gear 40 is only turned during an up or down cycle. To take advantage of both cycles, two rods 24 and 32 as in embodiments 100 and 200 respectively may be employed rather than the single rod 52. The first driver gear 40 may be interlocked with a first compound gear 42, which is interlocked with a second compound gear 44, which is interlocked with a slotted gear 46. The slotted gear 46 may interlock and rotate a gear 48 with a pully 50. A cable 54 may wrap around the pulley 50 and a second weight W(g) 53 may be secured to an end of the cable 54. The coupling rod 24 rotates the first driver gear 52 when the weight 11 rises or lowers while floating on the water 28. Therefore, linear motion of the tides is converted into rotational motion. Using the loosely coupled system, the single module raises the second weight W(g) 53. Pulley 50 connected to gear 48 free-wheels about generator axle 61 while the second weight W(g) 53 is being raised. Once the second weight W(g) 53 has been raised to a max height, the slotted gear 46 may disengage from gear 48 connected to the pulley 50. The second weight W(g) 53 then begins to fall, pulley 50 and gear 48 engage generator axle 61 imparting a rotational force to axle 61. Therefore, potential energy of the second weight W(g) 53 raised to height h is transformed to rotational motion of axle 61. The length of the notch of the slotted gear is calibrated to allow the second weight W(g) 53 to reach ground level before gear 46 re-engages with gear 48 and then the raising cycle repeats. A computerized control system monitors the precise position of the second weights W(g) 53 and rpm of the generator axle 61, thereby has complete knowledge of the available potential energy of the complete system available for turning axle 61. The second weights W(g) 53 may store potential energy by being kept in the raised position. If the computer's control system determines that the generator axle is turning at an acceptable rpm, it is then desired to store rising the second weights W(g) 53 in the raised position for future use. Piston/solenoid 58 rotates partial gear L away from the boom so that the second weight W(g) 53 can no longer be raised. Simultaneously, the control system instructs piston/solenoid 56 to lock the axle of gear 46 to prevent any rotational feedback from gear 48. With enough of the modules installed, the second weights W(g) 53 can be stored far in excess of what is needed to operate a generator perhaps for days, weeks or months.

Therefore, if maintenance is required, or some catastrophic event occurs, such as a debilitating Coronal Mass Ejection or Electromagnetic Pulse Radiation from a hostile aerial attack affecting the National Grid—the directly coupled/loosely coupled systems being mechanical continue to operate. In fact, the second weights W(g) 53 may operate under water. A further benefit of the loosely coupled approach is that the second weights W(g) 53 are pulled by gravity and therefore accelerate adding a bonus amount of energy. By installing a series of these modules, with storage capability modules shown in FIGS. 7 and 8, a potential energy farm is created where some second weights W(g) 53 drive the generator axle(s) 61 of a generator 60 by constantly raising/lowering second weights W(g) 53 and other second weights W(g) 53 remain raised thereby storing the potential energy for future demand.

Using the present invention, the owner or government of an island, uninhabited due to no electricity, can now develop the land for productive and profitable purposes. The government of coastal villages, too small or remote to justify a large power plant, can install the above generators in those villages. If an electrical power grid requires additional power generators to boost output, these systems may satisfy those requirements.

The upper surface of large floating platforms (weight 11) can serve as revenue generators for recovering costs by providing, recreational areas for fishing, boating slips, or small food/artifact concessions, etc. Further, jobs in construction, engineering, computers, and steel manufacturing may develop in abundance.

It should be understood, of course, that the foregoing relates to exemplary embodiments of the invention and that modifications may be made without departing from the spirit and scope of the invention as set forth in the following claims.

What is claimed is:

1. A generator for converting tidal fluctuation to electrical energy comprising:
    at least one first weight floatable in water;
    a first energy transfer mechanism comprising at least one driver gear;
    a first coupling rod connecting the at least one first weight to the at least one driver gear of the first energy transfer mechanism;
    a slotted gear rotatable by the at least one driver gear;
    a pulley gear comprising a pulley, wherein the pulley gear is interlocked with the slotted gear;
    a cable wrapped around the pulley of the pulley gear;
    a second weight attached to the cable; and
    a rotor coupled to the pulley gear, wherein
        the first coupling rod rotates the at least one driver gear when the first weight rises or lowers while floating on a body of water,
        the at least one driver gear rotates the slotted gear,
        the slotted gear rotates the pulley gear so that the cable raises the second weight,
        the slotted gear disengages from the pulley gear when the second weight reaches a maximum height, and
        the second weight falls, whereby the pulley rotates the rotor to generate electrical energy.

2. The generator of claim 1, further comprising a plurality of compound gears interlocked together to form a gear train, wherein the gear train transfers rotational energy from the first energy transfer mechanism to the slotted gear.

3. The generator of claim 2, further comprising a frame comprising a track, wherein the first driver gear and each of the plurality of compound gears comprise axle mounts resting within the track.

* * * * *